United States Patent [19]

Powell et al.

[11] 4,268,353
[45] May 19, 1981

[54] DEMOUNTABLE EXTERNALLY ANCHORED LOW-STRESS MAGNET SYSTEM AND RELATED METHOD

[75] Inventors: James Powell, Wading River; Shih-Yung Hsieh, Centereach, both of N.Y.; John R. Lehner, Rocky Hill, Conn.

[73] Assignee: The United States of America as represented by the United States Department of Energy, Washington, D.C.

[21] Appl. No.: 880,680

[22] Filed: Feb. 23, 1978

[51] Int. Cl.³ .............................................. G21B 1/00
[52] U.S. Cl. ...................................................... 176/3
[58] Field of Search ................................ 176/1, 3, 5, 7

[56] References Cited

U.S. PATENT DOCUMENTS 3,736,539  5/1973  File et al. ................................. 176/3

OTHER PUBLICATIONS

IEEE Pub. No. 75CH1097-5-NPS, pp. 496-498, Bushwell (11/18-21/75).
IEEE Pub. No. 77CH1267-4-NPS, pp. 334-338, Hsieh et al. (10/25-28/77).
IEEE Pub. No. 75CH1097-5-NPS, pp. 366-369, Lousteau et al. (11/18-21/75).
IEEE Pub. No. 73CH0843-3-NPS, pp. 558-569, DeMichele et al. (11/5-9/73).
IEEE Pub. No. 75CH1097-5-NPS, Proceedings of 6th Symposium on Eng. Prob. of Fusion Research, (11/75), pp. 623-637.

*Primary Examiner*—S. A. Cangialosi
*Attorney, Agent, or Firm*—Cornell D. Cornish; Leonard Belkin; Paul Devinsky

[57] ABSTRACT

Toroidal field coils are interlaced with other toroidal structures and are operated under supercooled conditions. To facilitate demounting the toroidal field coils, which are supercooled, they are made in the form of connected segments constituting coils of polygonal form. The segments may be rectilinear in form, but some may also be U-shaped or L-shaped. The segments are detachable from one another and are supported in load relieving manner. Power devices are used to displace the segments to facilitate removal of the coils from the aforesaid toroidal structures and to provide for the accommodation of dimensional changes and stresses due to thermal and magnetic conditions. The segments are formed of spaced parallel conductive slabs with the slabs of one segment being interdigitated with the slabs of the adjacent segment. The interdigitated slabs may be soldered together or slidingly engaged. The slabs are shaped to accommodate superconductors and to provide passages for a cooling medium. The slabs are moreover separated by insulator slabs with which they form a coil structure which is jacketed.

43 Claims, 41 Drawing Figures

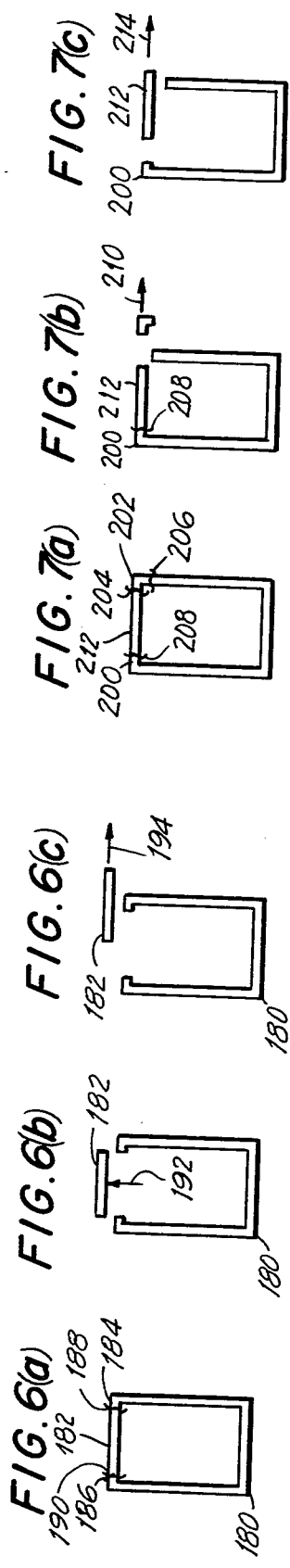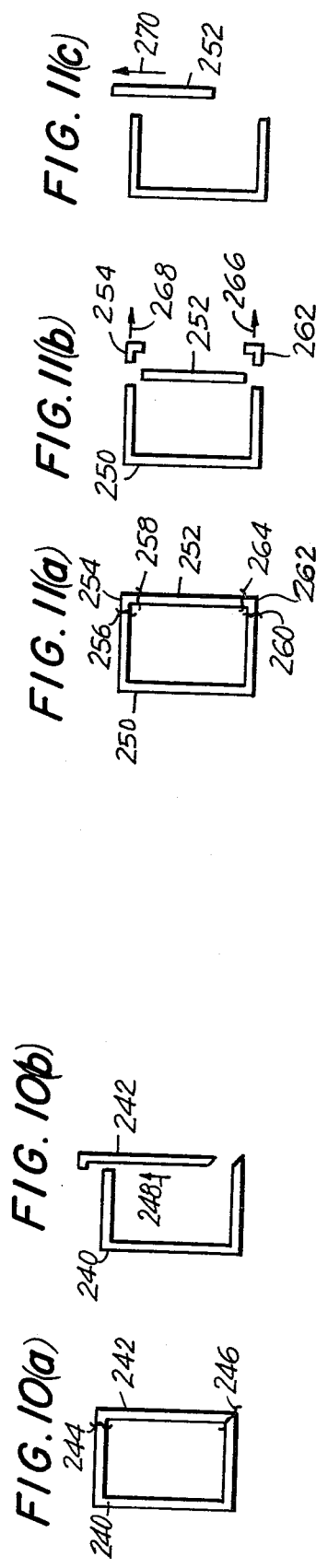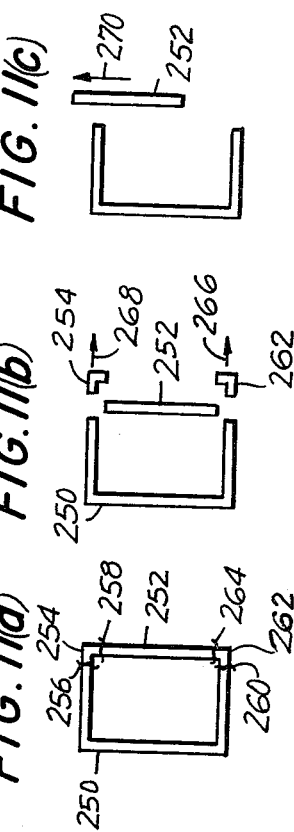

DEMOUNTABLE EXTERNALLY ANCHORED LOW-STRESS MAGNET SYSTEM AND RELATED METHOD

BACKGROUND

1. Field of the Invention

This invention relates to apparatus having demountable magnet systems and more particularly to experimental reactors for the investigation of the generation of power by fusion. The invention furthermore relates to coil structures and coil supports for fusion reactors and to methods pertaining to the same.

2. Prior Art

Toroidal field coils in a known nuclear reactor such as a Tokamak fusion reactor are interlaced with the blanket, OH and poloidal field coils thereof, as well as with neutral beam, coolant and vacuum lines, in a very complex arrangement. Not only does this make construction of the reactor cumbersome, but replacement of a failed toroidal field coil after construction would be extremely difficult, if not impossible. One illustration of this complexity of construction is shown by the ORNL EPR design ("Oak Ridge Tokamak Experimental Power Reactor Study Reference Design", ORNL, W-7405-Eng-26, 1975). Replacing a failed toroidal field coil in this reactor would involve removing and replacing a large number of radioactive massive components, with many cuts and seals to be made.

Of the many failure possibilities, three specific types of failure may be the following: in the first, failure of a toroidal field coil results in a non-operable reactor because it is impossible to replace the coil; in the second, the toroidal field coil can be replaced, but the reactor is down for a long interval (e.g., 3 years) while massive replacement operations, involving movement of a large portion of the blanket and shield structure, vertical field coils, etc., are carried out; in the third, the toroidal field coil is segmented (according to the invention as discussed hereunder) so that a failed segment can be replaced in a month without requiring operation on the rest of the reactor structure.

For purposes of analysis, each toroidal field coil is assumed to have an independent probability $P_1$ of having a nonrepairable failure per year of operation. For example, a nonrepairable failure could result from arcing, breakage, etc., inside the superconducting winding. A vacuum leak in the toroidal field coil dewar might or might not be repairable, depending on the nature of the leak and the toroidal field coil design. For an operating reactor the number of failures of the toroidal field coil system, per operating year, assuming that the failure of one coil will shut down the reactor, is $$P_F = NP_1 \text{ failures/operating reactor year} \quad (2.1)$$

where N is the number of toroidal field coils in the ractor. The reactor availability (percentage of time that the reactor operates) is then $$P_A = \frac{1}{1 + NP_1 t_R} \quad (2.2)$$

where $t_R$ is the toroidal field coil replacement time in years. If the toroidal field coil cannot be replaced and the reactor must be permanently scrapped, $t_R$ is taken as 30 years, the normal expected life of the plant. In practice, a replacement reactor could be built in 10 years, but this would reflect an extra capital cost. In order to compare the costs of plant non-availability on a common basis, the plants are assumed to be built at a normal interval of 30 years.

A plant availability of 80% is considered good for present power plants, both fission and fossil. Not all the down-time can be allotted to toroidal field coil replacement in a fusion reactor, however, since other scheduled and non-scheduled replacement and maintenance operations will undoubtedly be necessary. Blankets will have to be replaced, beam and vacuum lines maintained, etc., and failure of non-fusion reactor components will also contribute to reactor down-time. As a minimum, a plant availability of 0.95 is required considering only toroidal field coil replacement. For an overall plant availability of 0.8, this would correspond to 25% of the shut down time being a result of replacement operations on toroidal field coils.

Toroidal field coil systems can be designed to permit replacement of entire coils. For example, each of the UWMAK-I toroidal coils (B. Badger, et al., "A Wisconsin Toroidal Fusion Reactor Design", UWFDM-68, University of Wisconsin, November, 1973) were designed to be removable along with their corresponding blanket and shield assembly and there were 12 such modules in the reactor. However, such design approaches tend to result in very massive modular sections for the reactor and require poloidal field windings outside the toroidal field coils of very large current capacity. In addition, massive amounts of inter-coil support structure would have to be moved, and joints between modules would have to be cut and remade. The time required for these operations could be quite long.

With respect to the prior art, no prior patents have been located which anticipate the proposals of the invention. Some of the prior art patents which have been located are U.S. Pat. Nos. 3,416,110; 3,742,408; and 3,978,442.

Robert Morris in U.S. Pat. No. 3,416,110 discloses a structure having to do with a cooling feature of the present invention. More particularly, there is disclosed in this patent an electrical transformer having a form-fit casing and a magnetic core-winding assembly disposed therein. The sides of the casing support and maintain the magnetic core. The top and bottom portions of the casing support the electrical winding assembly and restrain it against movement during short circuit stresses. The casing is completely filled with a fluid dielectric, which is force circulated through the winding assembly. External heat exchanger means are furthermore provided. As will be seen, this structure relates generally to certain features of the present invention but is not remotely concerned with the overall combination.

As will also be discussed hereinafter, the invention proposes, among other features, the construction of coils in the form of connected segments. J. Jaeger in U.S. Pat. No. 3,742,408 discloses with respect to an underwater connector an inductive coupling technique for a make and break connector. The connector is designed to operate on AC signals and uses potted toroids which are coupled respectively to a source of signals and to a load. The toroids are interconnected using single-turn loops. As is disclosed in this patent, the loops may be formed of segments which may be clamped together using a quick-disconnected means such as a wing nut or such as a top plate cooperating with a pair of wing nuts. As will become apparent hereinafter, this has no anticipatory effect with respect to the invention disclosed herein.

E. Spicar in U.S. Pat. No. 3,978,442 discloses how to avoid short circuiting in transformer windings. He states that it is a requirement that windings should at all times and independently of the temperature of the associated transformer by prestressed with certain compressive stress. He observes, moreover, that the plastic settling of the insulating material leads to a gradual decrease of the clamping force. According to the invention disclosed in this patent, a plate is provided on which the yoke of the transformer rests and between this plate and the coils there are arranged clamping boxes, the pressure in which is transmitted to the ends of the coils. Between the plate and the bottom wall of the transformer are furthermore provided generating boxes. The clamping and pressure generating boxes are connected for transmitting hydraulic pressure between the boxes. By arranging the pressure generating boxes below the active part of the transformer, a hydraulic pressure is obtained in such boxes which corresponds to the weight of the active part. This pressure is utilized in order to achieve a substantially constant clamping pressure on the windings independent of the settling occurring in the insulating material within the winding during the drying procedure or during field operation of the transformer. Thus, there is shown a method of supporting windings or the like with variable forces. This, however, is not anticipatory of the invention disclosed in the present application, as will become apparent hereinafter.

C. W. Bushnell, Plasma Physics Laboratory, Princeton University, Princeton, N.J. has disclosed in an article, The Toroidal Field Coils for the PDX Machine, the formation of a split coil design in which joints between conductor segments are formed with the use of copper or steel pins. Such joints, it is believed, will not be able to withstand the stresses induced by magnetic fields and thermal contraction in a superconductivity environment and may not afford the conductivity required for coils in fusion reactors.

F. A. Puhn et al, General Atomic Company, San Diego, Calif. discloses, in Design of Demountable Joint for Doublet III Toroidal Field Coil, a demountable finger joint at the top of a toroidal field coil. The coil, as in the previous article by Bushnell, consists of non-rectilinear segments and similarly employs connecting pins. These pins, which are of various types, would not, it is believed, be suitable for withstanding the stresses generated in a superconductor environment.

R. O. Hussung et al, Union Carbide Corp., Nuclear Division, Oak Ridge, Tenn., in ISX Toroidal Field Coil Design and Analysis, discloses an arrangement permitting removal of an upper segment of a toroidal field coil. The arrangement fails to take into account displacements due to low temperatures and high magnetic forces in the manner of the present application.

SUMMARY OF THE INVENTION

It is an object of the invention to provide an improved superconducting magnetic system for use particularly with systems with which the magnetic system must be physically interlaced such as, for example, toroidal structures in a fusion reactor.

Yet another object is to provide an improved coil design concept which will permit fabricating coils at plants remote from the site of installation and which will permit installation of such coils on site while avoiding cumbersome operations heretofore required.

Still another object of the invention is to provide improved methods relating to the fabrication and installation of magnet systems and components therefor with provision being made to accommodate dimensional changes and stresses due to thermal variation and magnetic fields.

Yet another object is to provide an improved demountable externally-anchored low-stress magnetic system.

The demountable externally-anchored low-stress magnet system of the invention is a system in which coil segments will be fabricated at a central factory facility. These segments can then be shipped, for example, to a reactor site and handled by present-day transportation systems and equipment. During the assembly process, each toroidal field coil is formed from basic coil segments. They are joined such that the conductors in each segment are all connected in series in a helix form. This magnet coil construction completely eliminates on-site coil winding processes heretofore required for the construction of coils for fusion reactors. The advantages thus afforded are extremely significant when the relatively huge sizes of such coils is taken into consideration.

Further important advantages of the magnet system of the invention include the following:

(1) A malfunctioned coil segment can be replaced by a spare unit of corresponding length. The coil segment replacement operation will not disturb any other part of the reactor system and thus minimizes the required reactor down time.

(2) Maximum accessibility is provided both during reactor construction and during reactor maintenance since all the outer vertical coil segments (or top horizontal coil segments) can be disengaged to provide the accessible working space. With the magnet system of the invention, it will be feasible to construct the blanket/shield assembly and associated neutral beam ducts, vacuum ports, fueling lines, etc., before the toroidal field coil set is installed. This will result in large time and cost savings in reactor construction.

(3) Because of the low stress and absence of tensile strain in the conductors of the invention, as will appear more fully hereinafter, high field magnet systems using $Nb_3Sn$ or other brittle superconductors will have possibilities of use for magnetic fusion.

In achieving the above and other objects of the invention there is proposed apparatus comprising at least one superconducting coil and means operatively associated with the coil to constitute at least part of a superconducting magnet system. The coil further comprises at least two coil segments each formed from a plurality of parallel conducting elements. The end portions of the conducting elements are in a spaced relationship one to the other. The spaced end portions of the conducting elements are interdigitated to provide electrical connection between the conducting elements of adjacent segments so that the conducting elements form a helix.

Means for demountably connecting the interdigitated end portions of adjacent segments to form conducting joints so as to enable facile assembly and disassembly of the coil segments are also provided in accordance with the invention.

External means for supporting the coil segments and the joints to prevent stresses in the coil form exceeding the level where the coil would revert to a normally conductive state are attached to the joined coil segments at a predetermined plurality of locations around the perimeter of the coil. The support means are constructed to enable relative motion between the support means and the interdigitated end portions of the segments to prevent stresses caused by thermally caused dimension changes.

In a preferred embodiment of the invention, at least one of the segments is at least partly of generally rectilinear shape. The coil in the preferred embodiment is preferably of polygonal shape and thereby includes a plurality of sides, said sides being of generally rectilinear form, said segments also being of generally rectilinear form and cooperatively constituting the sides of the polygonally shaped coil. The sides of the polygon and the segments need not necessarily coincide and the segments may be part of more than one side of the polygon.

The segments are, as is the coil, of substantial size, and are therefore of weights tending to constitute loads on themselves and on each other. The apparatus of the invention therefore further comprises load bearing means coupled to at least one of the segments and operative to support the same and relieve at least part of the load thereof.

In further accordance with the invention, there is provided a heat insulating means connecting the load absorbing means to the associated coil. The heat insulating means may include a laminated support supporting at least part of the weight of the coil on the load absorbing means.

In further accordance with the invention, the load bearing means may include means for the relative displacement of at least one of the segments into and out of engagement with the other of the segments. Said means may also be used for accommodating dimensional variations and stresses due to thermal changes and magnetic fields.

According to yet another aspect of the invention, the segments are provided with a particular construction. The segments have contiguous ends and each segment includes a plurality of parallel conducting elements including end portions in spaced relationship, the respective end portions of adjacent of the segments being in interdigitated relationship, there being furthermore provided electrically conductive fastening means connecting the interdigitated end portions so that the conducting elements are connected in the form of a helix.

In the specific segment construction, insulating means may be provided between adjacent of the conducting elements in each segment. Furthermore, each of the conducting elements may be formed of two elongated slabs in facing relationship and cooperatively having proximal and distal faces, and a superconductor positioned between and in thermal contact with the proximal faces of the slabs, the superconductor extending for substantially the length of the slabs.

According to yet another feature of the invention, the aforesaid slabs may be provided in the distal faces thereof with an arrangement of cooling grooves for the passage of a cooling medium.

According to yet another consturctional feature of the invention, each segment may be provided with a casing, encircling the plurality of conducting elements thereof.

According to yet another aspect of the invention, the aforesaid conducting elements may have longitudinal edges and gaps may be provided between the casing and these edges to accommodate changes of dimension of the conducting elements due to temperature changes.

Viewing the invention from still a further aspect thereof, there is provided in accordance therewith a nuclear fusion reactor comprising means for containing plasma including blanket and shield means in toroidal form and a plurality of toroidal field coils radially disposed relative to and encircling said blanket and shield means, each of said coils including a plurality of segments demountably connected to each other.

In accordance with yet another aspect of the invention, each of the aforementioned coils may be provided in the form of a polygon including a plurality of sides at least one of which is formed at least in part by one of the aforementioned segments. Further, there may be provided, for each coil, means to displace said one segment thereof relative to the other segment thereof to facilitate detaching the corresponding coil from the blanket and shield means.

In accordance with further embodiments and features of the invention, one of the segments may be U-shaped and another of the segments rectilinear and positioned to close the U-shape segment.

Still further, in another embodiment, at least two of the segments of a coil may be of rectilinear form. Yet in accordance with a further embodiment of the invention, one of the segments may be L-shaped.

According to the invention, a particular coil structure is provided. This coil is particularly adapted for use in a fusion reactor and comprises a plurality of segments demountably connected together to constitute a polygonal form, each of said segments including a plurality of spaced parallel conducting elements and a plurality of insulators therebetween, the conducting elements extending beyond the insulators and being interdigitated with the conducting elements of another segment, a solder connection being provided between the interdigitated conducting elements.

With respect to the conducting elements and the insulators mentioned hereinabove, these may be of rectilinear slab form. These slabs may be provided with faces grooved to accommodate a superconductor and to accommodate the passage of a cooling medium as was noted hereinabove.

According to still another aspect of the invention, there are provided segments capable of constituting a demountable coil and of a construction of the type noted hereinabove. Namely there are provided segments of a construction comprising a plurality of conductive slabs in spaced parallel relation, insulator slabs between said conductive slabs, and a casing encompassing said conductive and insulator slabs, said conductive slabs extending beyond the insulator slabs to form fingers for connecting to the further segment. The conductive slabs may moreover be, for example, of copper and the superconductor employed in connection therewith may be, for example, of the group consisting of $Nb_3Sn$, $Nb_3Al$, and $Nb_3Ge$.

According to yet another aspect of the invention, there is provided a method of improving the installation, fabrication, maintenance and repair of a supercooled magnetic system or of a fusion reactor which includes a toroid structure encircled by a plurality of coils, said method comprising fabricating the coils of a plurality of demountable sections and operatively associating the sections together around the toroid structure to form said coils. The coils are preferably formed with a polygonal shape according to the method of the invention and at least some of the segments are mounted on displaceable supports. The supports may be displaced to accommodate distortion or dimensional changes or stresses due to thermal variation and magnetic fields.

As has been noted hereinabove, the segments may be fabricated at a station remote from the toroid structure on which the coils are to be mounted and the segments are connected together on site at the toroid structure in a manner which is substantially more facile than the methods heretofore required.

The method of the invention furthermore relates to fabricating the segments of a plurality of conductive slabs in spaced parallel relationship with insulative slabs therebetween, the conductive slabs being made with a length greater than the insulated slabs to form fingers for connection to another segment.

The method of the invention moreover comprises interdigitating the fingers of adjacent segments and soldering the interdigitated fingers together.

The above and further objects, features and advantages of the invention will be found in the detailed description which follows hereinafter as illustrated in the accompanying drawing.

BRIEF DESCRIPTION OF DRAWING

In the drawing:

FIGS. 3(a)-(c), 4(a)-(c), 5(a)-(c), 6(a)-(c), 7(a)-(c), 8(a)-(b), 9(a)-(b), 10(a)-(b), and 11(a)-(c) diagrammatically illustrate segment arrangements for coils of the invention as well as displacement methods for the same;

DETAILED DESCRIPTION

Figure 1:
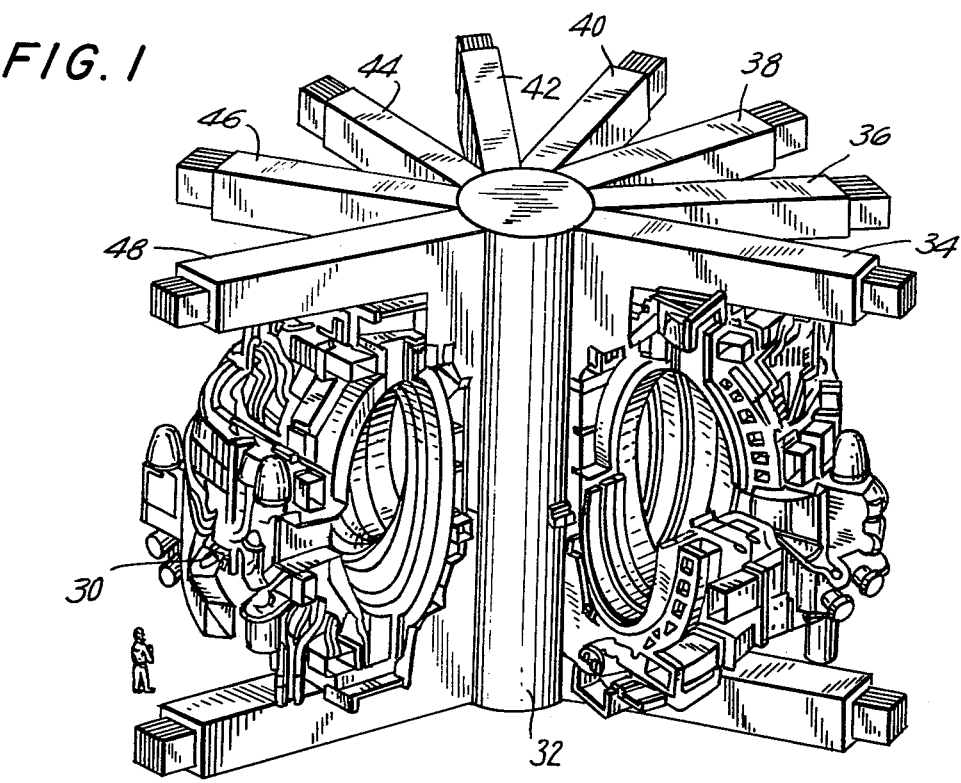
FIG. 1 is a partly diagrammatic perspective view of a fusion reactor, partly broken away, which employs coils provided in accordance with the invention.

The toroidal field (TF) coils in, for example, a Tokamak fusion reactor have to be interlaced with the plasma chamber, OH and poloidal field coils, and the neutral beam, coolant and vacuum lines, etc., in a very complex arrangement, as noted hereinabove. This makes the construction of the reactor cumbersome since the continuously wound TF coils have to be built on site first and the rest of the reactor components installed inside the coil assembly afterwards. This can create serious problems of space and accessibility and requires complicated installation procedures for that part of the reactor system inside the TF coil assembly.

In addition, as noted above, the replacement of a failed TF coil after cnstruction would be extremely difficult, if not impossible, which then requires that the TF coil system must be very reliable over its 30 year service lifetime. Replacing a failed TF coil in this type of reactor construction would involve removing and replacing a large number of highly radioactive, massive components with many major cuts and seals to be made. This means a very long plant down time, even if it were technically feasible, reduced plant availability and large capital losses.

This invention presents an alternative TF coil concept which avoids the above difficulties. The concept involves a demountable externally-anchored low-stress magnet system, and is intended to provide easier coil installation for reactor construction, as well as improved accessibility for reactor maintenance and repair. This magnet can be applied to various large superconducting magnet systems.

According to the system and method of the invention, each of the TF coils will be formed by several straight coil segments which can be readily joined (or disjoined) to form a polygon, in contrast to conventionally wound coils, which would be either circular, oval, or D-shaped constant-tension coils.

The following very desirable conductor design goals, in addition to those mentioned above, can be achieved with the magnet design concept of the invention:

a. high current capability ($\geq 10^5$ amps);
b. mechanical rigidity;
c. cryostabilization (heat transfer coefficient $<0.4$ w/cm$^2$) and good cooling;
d. simple, mass produced conductors and coil segments.

These advantages can be provided with straight flat-plate or slab-type conductors. Basically, the finished conductor may be, for example, a long copper plate or slab with length l, width w, and thickness t. Both ends of the conductor may be machined to a thickness of t/2 for joining to other conductors during the coil assembly process, as will be shown. The cross-section of this conductor involves grooves for cooling and/or for accommodating a superconductor. The superconductor can be transposed braid or any other superconducting wire or tape. It is sandwiched between copper plates that are held together by solder. The cooling grooves are machined on both sides of the conductor plate. The conductor for a typical design may be 1.0 cm thick and 1.0 meter wide, and may be fabricated, for example, in 20 and 30 meter lengths to form a 20 m. × 30 m. rectangular coil when assembled. The finished conductor plates are stacked in a steel case which also serves as the liquid helium dewar. Insulating ceramic or organic composite plates are placed between the conductor plates during the assembly process. A segment may contain fifty conductor plates, with insulating plates between conductors and around the inside perimeter of the case. These coil segments are the basic units of the entire TF coil system; that is, all the coils are formed from these or similar units. If any coil segment malfunctions, it can be replaced by a spare unit of corresponding length.

As mentioned above, each TF coil is formed from basic coil segments and, thus, there is no coil winding process required on site. Instead, coil segments are joined together. In one case, the conductor ends are interdigitated and soldered together by the use of inserted heater plates, which are thereafter replaced by insulator plates to complete the turn-to-turn and coil-to-ground insulation. Ceramic insulators can be used since the coil segments are straight lengths and no bending is required.

As a result of the end joining process, the conductor plates are all connected in series in a helix form. The beginning and the end of the conductors in the rectangular multi-turn coil can then be connected to power leads or to neighboring TF coils. Each TF coil may consist, for example, of fifty turns and there may be in a typical case twenty-four coils all together.

A final step in the TF coil construction after the conductor joining process is to weld corner cases and straight coil case sections together to form an integral helium dewar. Sleeve reinforcement may then be welded around the corner region to strengthen its mechanical rigidity. The soldering of the interdigitated conductor plates is for electrical contact only. The welded corner case and the reinforcement sleeves provide the primary distributed rigid conductor support in the joint area. The actual coil and corner support depend on the coil support system which consists of coil support pads of low thermal conductivity, and an external hydraulic support system which will automatically adjust the inplane and outplane loads to counteract the force loadings created by magnetic field and to compensate for thermal expansion and contraction of the coil.

The loads are transmitted from the coil case, via support pads, to an external room-temperature hydraulic system which then transmits the magnetic loads to an external warm reinforcement support structure, such as a prestressed concrete reactor vessel (PCRV), similar to those used in some fission reactors. A preliminary stress analysis shows that average conductor stress is lower ($4 \times 10^7$ N/m$^2$) and compressive in nature.

The configurational similarity between this coil conductor arrangement and conventional transformer core laminations results in much lower matrix A. C. losses due to the pulsed poloidal fields as compared to conventional wound coils. The alternatively stacked conductor and insulator plates in this coil design are made parallel to the direction of the pulsed field, in contrast to most superconducting coil designs where the wide surface of the conductor has to be wound perpendicular to the direction of the pulsed field. M. N. Wilson's formula (M. N. Wilson, et al., Rutherford Laboratory Report RL-76-038, United Kingdom, (Apr. 1976)) for a conductor slab of thickness $2a$ parallel to the field pulse was used to estimate the losses.

$$Q = \frac{2(\Delta\beta)^2 a^2}{\pi^2 \rho t} \text{ (joules/m}^3\text{)} \quad (1)$$

where $a = 0.005$ m. in the present conductor design; $\Delta\beta$ is chosen to be 0.5 Tesla; $\rho$ is the resistivity and its average value is estimated to be $5 \times 10^{-10}$ $\Omega$ —m as was used by ANL's EPR study (W. M. Stacey, et al., "Tokamak Experimental Power Reactor Studies", ANL/CTR-75-2, ANL, (June, 1975)); t is the rise time of 1 second. The burn cycle for a power reactor of UWMAK II type is expected to be on the order of 1000 seconds. This gives 2.88 kW (4° K.) eddy current loss for a set of twenty-four coils having a construction in accordance with the invention. The computation does not include shielding effect which could reduce the losses by another factor of 10.

There are also eddy current losses in the coil case. Knowing that the resistivity of stainless steel is several orders of magnitude higher than copper, the coils case's contribution to the losses should not cause any concern.

The following formula from M. N. Wilson's work (supra.) was used to estimate hysteresis losses in the superconductor:

$$Q/Q_o = \frac{\beta}{12} \text{ (joules/m}^3\text{) for } \beta < 2 \quad (2)$$

$$Q/Q_o = \left(\frac{1}{\beta} - \frac{4}{3\beta^2}\right) \text{ (joules/m}^3\text{) for } \beta \geq 2 \quad (3)$$

where $\beta = \frac{\Delta\beta}{\mu_o J_c a}$, $Q_o = \frac{(\Delta\beta)^2}{2\mu_o}$ and $2a$ is the thickness of the superconductor sheet. These equations were plotted and the maximum of $Q/Q_o$ was used to compute the hysteresis losses. This gives the total hysteresis loss of 2.16 W (4° K.) for the entire coil system.

The heat load through gas-cooled leads is by far the largest loss in this design because of the high magnet current. According to one power lead analysis, the loss is linearly proportional to the current carried and is $3.0 \times 10^{-3}$ liter/hour/ampere/pair ("Conceptional Studies of Toroidal Field Magnets for the Tokamak Experimental Power Reactor," final report prepared by General Electric Company, (November, 1976)). Therefore, a set of twenty-four pairs of leads carrying 200,000 amps would require 14 MW of electrical power during operation to run a helium liquefier or refrigerator. In actual practice, coils can be grouped together and connected in series to reduce the number of power lead pairs required, if desired. Hence 14 MW(e) would be the maximum room temperature power requirement for leads and this power requirement could readily be cut by a factor of 2 or 3. In addition, the value of $3 \times 10^{-3}$ liter/hour/amp/pair is quite conservative as compared with the optimized power lead calculations of Hilal (M. A. Hilal, "Optimization of Current Leads for Superconducting Systems," 1976 Applied Superconductivity Conference, Stanford University, Stanford, CA, (1976)) (100% Carnot efficiency). He projects an ideal power requirement of 300 W(e)kA pair. With practical refrigerator efficiencies of ~25%, the input power required to overcome lead heat leaks would be only 5 MW(e).

As noted above, coil case support pads are used. Fifty such support pads per coil can be employed, for example. Both inplane and out-of-plane supports are assumed to be included in this number.

According to a previously available report (J. Powell, et al, "Warm Reinforcement and Cold Reinforcement Magnet Systems for Tokamak Fusion Power Reactors," BNL Report, 17434, (1972)), a support pad of epoxy fiberglass and stainless steel laminate, half a square meter in area and 100 cm thick, can be designed for a 2 watt heat leak from a 20° K. heat station to the 4° K. coil case region. Hence, the heat load per coil is 100 watt and the total load is 2.4 kW (4° K.).

The coil construction method of the invention will definitely eliminate the tedious on-site coil winding process and the required winding machineries heretofore required by conventional design. However, the superconductor is no longer continuous and has to go through a resistive region at each conductor joint. There may be, for example, two-hundred joints per coil and this may cause some concern about the Joule heating created at the joints. It turns out that the losses at the joints are insignificant provided that good electrical contact can be maintained. The heat load can be estimated as follows:

Assuming that the thickness of the copper conductors between the superconductors at the joint is 2 mm., the resistance of a 2 mm. thick resistive region with an area of 1.0 m. × 1.0 m. is given by $$R = \rho \frac{L}{A} = 5 \times 10^{-10} \Omega - m \times \frac{0.002}{1 \times 1} = 10^{-12} \Omega. \quad (4)$$

qe loss per joint is therefore, $$I^2 R = (2 \times 10^5)^2 \times 10^{-12} = 4 \times 10^{-2} \text{ watt}. \quad (5)$$

And the loss per coil is
$$200 \times 4 \times 10^{-2} = 8 \text{ watt}$$

which results in 192 watts of total loss for a set of twenty-four coils. There are films of solder between the joint and between the superconducting braid (assuming 1.0 m. wide continuous braid was used) and the copper stabilizer. However, their total thickness is less than a tenth of a millimeter and their contribution to the losses is negligible.

Using a conversion factor of 326 W/W (T. R. Strobridge, "Cryogenic Refrigerators—An Updated Survey"), NBS Technical Note, 655, (1974)), the above estimated heat loads including additional miscellaneous loads require about 17 MW(e) of input refrigeration power. Therefore, 20 MW of room temperature refrigeration power will be more than adequate to handle the entire TF magnet system. This is approximately one percent of the electrical output from a 2000 MW(e) reactor of the UWMAK II size. This analysis thus implies that the refrigeration load for the magnet system of the invention is well within acceptable range.

Referring next to the drawing and particularly to FIG. 1, there is shown in perspective view and partially broken away a fusion reactor employing coils provided in accordance with the invention. More particularly, there is indicated a physical toroidal structure 30 constituted in conventional manner by the blanket and shield assembly and by the associated neutral beam ducts, vacuum ports, fueling lines and so forth. This toroidal structure has extending through the center thereof a central column 32. A plurality of coils are provided in interlaced relationship with the toroidal structure 30. Some of these coils are indicated by way of example at 34, 36, 38, 40, 42, 44, 46 and 48. In the illustrated construction, there are actually twelve of such coils, each of these coils being formed of segments in a manner to be described in greater detail hereinafter. It is to be noted, however, that in completed form, that is, with the outer segments connected to the respective coils, these coils are interlaced with the toroidal structure 30 in such a manner that the TF coils each encircle a part of the toroidal structure 30. Therefore, if these coils were not segmented it would be an extremely difficult job to remove the same and in fact to install the same inasmuch as the installation would require complete coil winding on site and removal would require the cutting apart of a solid coil construction.

It will be readily appreciated, however, that the segmented form contemplated in accordance with the invention will permit the coil segments to be fabricated by the use of mass production techniques at a fabricating plant remote from the site of the installation and the transportation of the same by currently available transportation means to the installation, whereat the segments can be secured in position in interlaced relationship with the toroidal structure 30.

Figure 2:
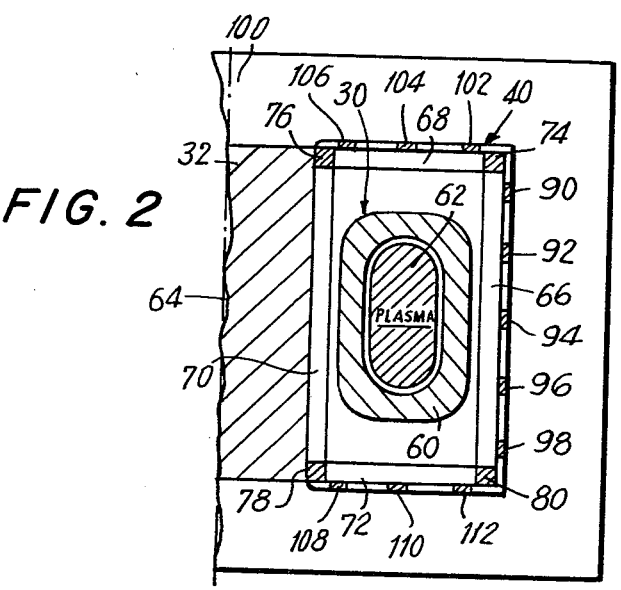
FIG. 2 is a diagrammatic illustration corresponding to a radial cross-section through a coil in FIG. 1.

FIG. 2 is a cross-sectional view through one of the coils illustrated, for example, at 40 in FIG. 1. More particularly, FIG. 2 illustrates the toroidal structure 30 consisting of a blanket and shield arrangement 60 within which is contained the plasma 62 during operation. Also appearing in FIG. 2 is the central column 32, the central axis of symmetry of the structure being illustrated at 64.

Herein it will be observed that the coil 40 as well as the other coils are of polygonal form and consist of a plurality of segments. More particularly, the coil 40 consists for example of 4 segments 66, 68, 70 and 72. These segments overlap and are connected at the corners 74, 76, 78 and 80.

Segment 66 is supported, by way of example, by supports 90, 92, 94, 96 and 98. These are supports to the warm reinforcement structure indicated in the form of a pre-stressed concrete reactor vessel (PCRV) 100 of conventional construction.

Additionally, it will be noted that segment 68 is connected to structure 100 by means of supports 102, 104 and 106 whereas segment 72 is supported on supports 108, 110 and 112 in the manner of the other supports. Segment 70 is connected to center column 32 by means of supports (not shown).

Figure 3A:
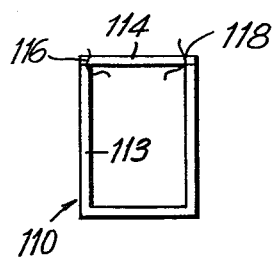
Figure 3B:
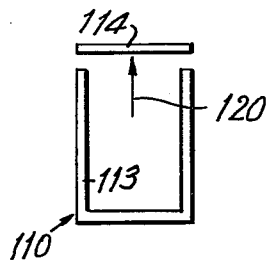
Figure 3C:
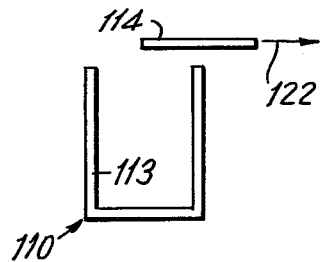

A wide variety of coil forms are permissible in accordance with the invention. The coils are, however, preferably polygonal and/or comprise at least one rectilinear segment. FIGS. 3(a)–3(c) show a second coil form and the possibility of demounting the segments thereof. More particularly, in FIG. 3(a) is shown a coil 111 in the form of a rectangular or polygon comprising a U shaped segment 113 and a rectilinear segment 114. The zones at which the segment 114 can be demounted are indicated at 116 and 118. In accordance with the method of the invention, the disconnection of segment 114 at areas 116 and 118 permits the disconnection thereof from segment 113. The segment 114 is displaced vertically upward in the direction indicated by arrow 120 and is then moved longitudinally off of the U shaped segment 113 as indicated in FIG. 3(c) by the arrow 122.

Figure 4A:
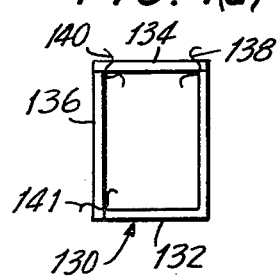
Figure 4B:
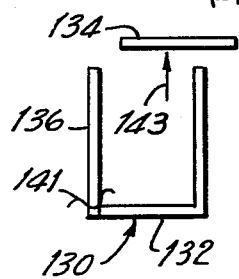
Figure 4C:
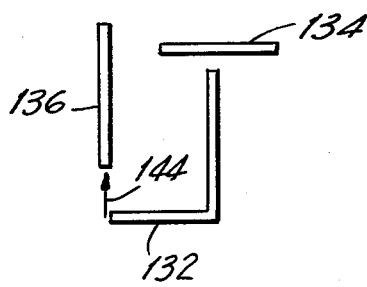

In FIG. 4(a), a coil 130 is shown which comprises an L shaped segment 132 and 2 rectilinear segments 134 and 136. The disjointing areas or zones are indicated at 138, 141 and 142. The disconnection of segment 134 permits the displacement of the same vertically upwards as indicated by arrow 143. The disconnection of segment 136 at zone 141 permits the displacement of segment of 136 upwardly as shown by arrow 144 in FIG. 4(c) following the longitudinal displacement of segment 134 which precedes the displacement of segment 136.

Figure 5A:
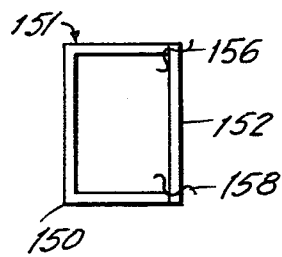
Figure 5B:
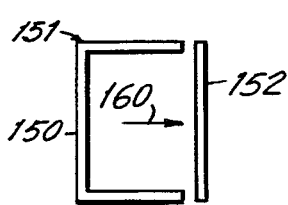
Figure 5C:
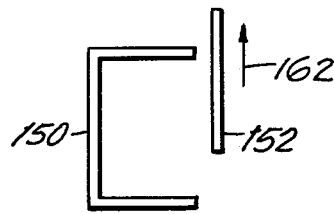

FIGS. 5(a)–5(c) illustrate a further embodiment of the invention wherein is shown a U shaped or C shaped segment 150 operating in combination with segment 152 to constitute a coil 154. The disjoints are indicated at 156 and 158. Disconnection at zone 156 and 158 permit lateral displacement of segment 152 as shown by arrow 160 in FIG. 5(b). Thereafter, the segment 152 can be moved veritically upwards as indicated by arrow 162 in FIG. 5(c).

FIGS. 6(a)-6(c) illustrate a further embodiment of the invention wherein U shaped segment 180 operates in conjunction with rectilinear segment 182. The U shaped segment 180, however, has in-turned parts 184 and 186 and the disjoints are indicated at 188 and 190. FIG. 6(b) illustrates the upward movement of segment 182 according to arrow 192 and FIG. 6(c) indicates the longitudinal displacement of segment 182 as indicated by arrow 194.

FIGS. 7(a)-7(c) illustrate a further embodiment of the invention wherein a segment 200 is almost rectangular in form except for the L shaped corner 202. The disjointing zones are indicated at 204 and 206 as well as at 208. The removal of segment 202 is indicated in 7(b) by arrow 210. This permits the disconnection of a part of the nearly closed segment indicated at 212 in the direction of arrow 214 in FIG. 7(c).

FIGS. 8(a) and 8(b) illustrate yet another embodiment of the invention wherein segments 220 and 222 may be disconnected at 224 and 226 so that segment 220 can be displaced as shown by arrow 228 in FIG. 8(b).

In FIG. 9(a) is illustrated a similar embodiment of the invention wherein segment 230 can be disconnected from 232 which is displaced as indicated by arrow 234 in FIG. 9(b).

FIGS. 10(a) and 10(b) illustrate yet another embodiment of the invention wherein segment 240 can be separated from segment 242 at disjoint zones 244 and 246. This permits the movement of segment 242 as indicated by arrow 248 in FIG. 10(b).

In FIG. 11(a) is indicated a C shaped or U shaped segment 250 connected to segments 252 and 254 at disjoint zones 256, 258 and 260, the latter zone being connected to a further L shaped segment 262 which is connected to segment 252 at zone 264. Removal of segments 254 and 262 in the direction indicated by arrows 266 and 268 permit removal of segment 252 in the direction of arrow 270 as appears in the FIG. 11(c).

It will be readily appreciated that the various embodiments described hereinabove are illustrative only of the many different forms which coils and coil segments can take in accordance with the invention and that many variations are possible within the scope of protection afforded by the appended claims.

The coils of the invention as will become even more apparent hereinafter are formed by utilizing a plurality of slabs or plates. These slabs or plates are generally formed of two parts, as better illustrated in FIGS. 12(a)-12(c) which respectively illustrate three further embodiments of the invention.

Figure 12A:
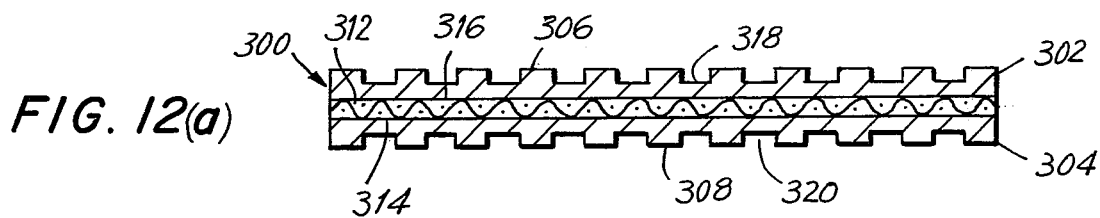
FIGS. 12(a)-(c) are cross-sections through respective conductive elements which can be used in making the aforementioned coils.

In FIG. 12(a) is illustrated a slab or plate 300 fabricated of copper parts 302 and 304. These parts have distal faces 306 and 308 and proximal faces 312 and 314. The proximal faces sandwich a superconductor 316 therebetween. This superconductor in the illustrated embodiment is constituted by a transposed filamentary conductor braid, the details of which do not require discussion in this text. The distal faces 306 and 308 are provided with a plurality of respective grooves indicated generally at 318 and 320. The purpose of these grooves is to provide for the passage of a cooling medium as will be described in greater detail hereinafter.

Figure 12B:
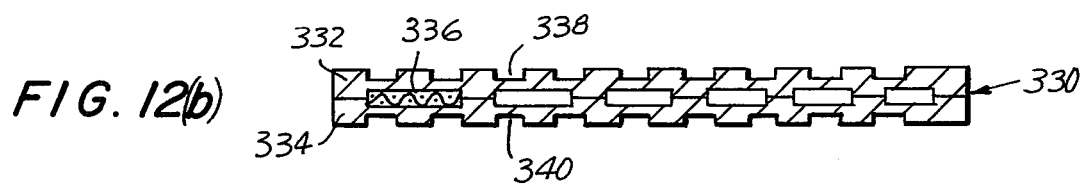

A conductive element 330 is illustrated in FIG. 12(b). It consists of two copper parts 332 and 334, having a multiplicity of internal grooves each adapted to accommodate a superconductor indicated, by way of example at 336. This superconductor is a twisted filamentary superconductor in a copper matrix, the details of which require no further explanation in this text. Once again the distal faces of the parts 332 and 334 are provided with a multiplicity of grooves indicated by way of example at 338 and 340 for the passage of a cooling medium.

Figure 12C:
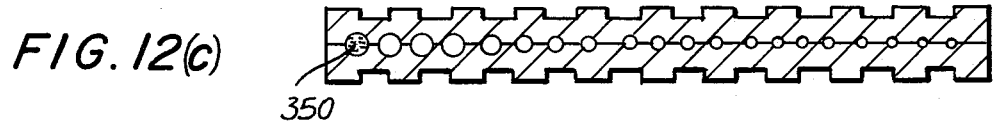

FIG. 12(c) illustrates a further form of conductive element wherein the superconductor indicated at 350 is accommodated in a multiplicity of circular grooves provided for the purpose, these grooves being of decreasing diameter as viewed from left to right in FIG. 12(c).

Figure 13:
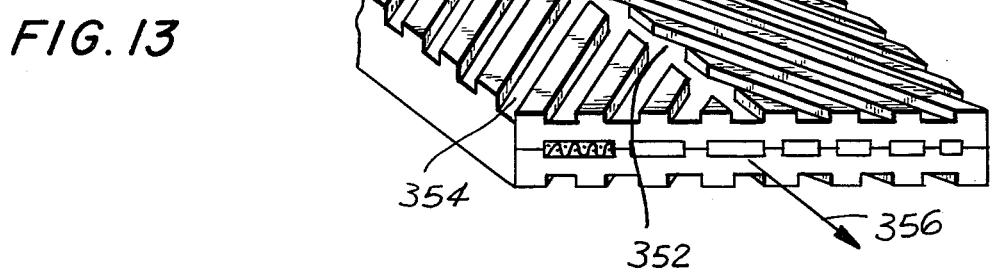
FIG. 13 is a diagrammatic perspective view of the conductive element of FIG. 12(b)

FIG. 13 is a perspective view of the conductive element illustrated in FIG. 12(b). This view illustrates that there is provided for the cooling medium a central channel 352 and a plurality of inclined channels 354 branching therefrom. Alternatively the cooling grooves may comprise parallel inclined grooves extending transversely across the face of the slabs. The concealed face of the conductive element has the same arrangement of grooves. Passage of the cooling medium through the various grooves provides for the conventional cooling employed in reactors of this type as is known from other disclosure. The passage of current through the superconductors is illustrated by the arrow 356.

Figure 14A:
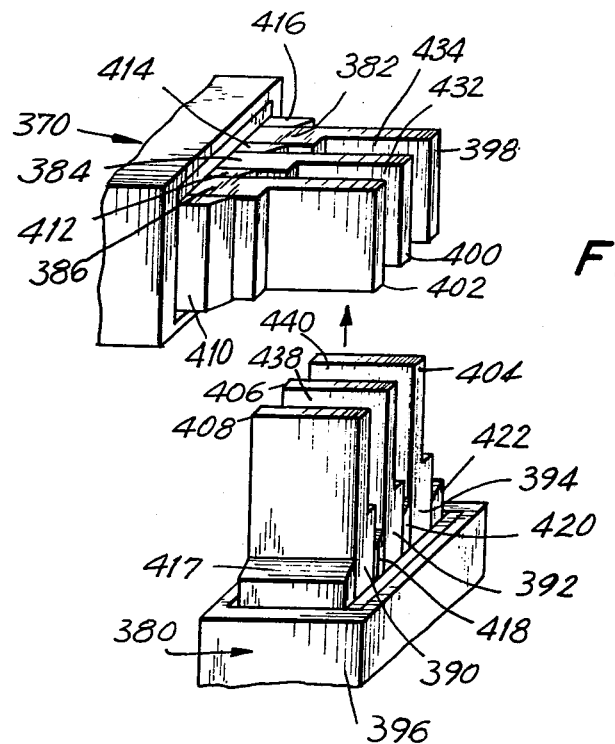
FIGS. 14(a) and (b) diagrammatically illustrate the joining of two coil segments.

FIGS. 14(a) and (b) respectively illustrate the engaging of the adjacent ends of two contiguous segments of a coil. Herein it will be seen that there are two segment end portions 370 and 380. The conductors 382, 384 and 386 protrude from jacket 388 of end portion 370. Conductors 390, 392, and 394 protrude from jacket 396 of end portion 380. The number of conductive elements are illustrative only, it being understood that there can be far greater number of these conductive elements in each coil segment.

It will be noted that the conductive elements protrude in the form of fingers reduced thickness (i.e., a thickness about equal to half that of the main body of the conductive element). These fingers are indicated, by way of example, at 398, 400, 402, 404, 406 and 408. It will be moreover observed that the conductive elements are bracketed by insulative elements 410, 412, 414 and 416 with respect to end portion 380 and insulative elements 417, 418, 420 and 422 with respect to end portion 380.

Figure 14B:
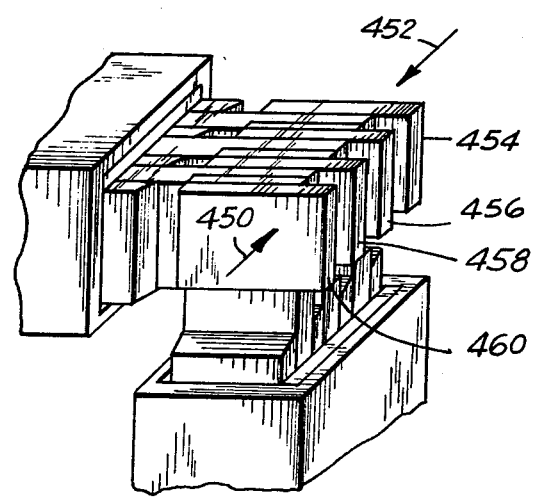

The surfaces of the various fingers may be slidingly engaged to accommodate dimensional changes due to thermal changes and to accommodate stresses due to magnetic fields. They may also be pre-tinned for purposes of soldering. These surfaces are indicated, for example, at 430, 432 and 434 with respect to end portion 370 and at 436, 438 and 440 with respect to end protion 380. These fingers are brought together in interdigitated relationship as indicated in FIG. 14(b). If they are to be soldered a clamp is applied as indicated by arrows 450 and 452 after heater plates have been appropriately positioned as indicated at 454, 456, 458 and 460. The insulated clamp is applied in such a manner to the joint as to provide good contact between the tinned surfaces of the conductor elements and also between the conductor elements and the heater plates. When proper soldering action is finished, the heater is turned off with the clamps on. The clamps and heaters are removed when the joint returns to room temperature. Thereafter, there is provided electrical continuity of the required type between the conductor elements in the respective segments with the possibility of disjointing or demounting as has been discussed hereinabove. It will appear from what has been stated above that the conductive elements of the segments constituting any one coil can be connected together in such a manner as to form a helix, thereby constituting a coil in the conventional sense of the term, to provide the necessary field relating to the operation of the associated reactor.

Figure 15A:
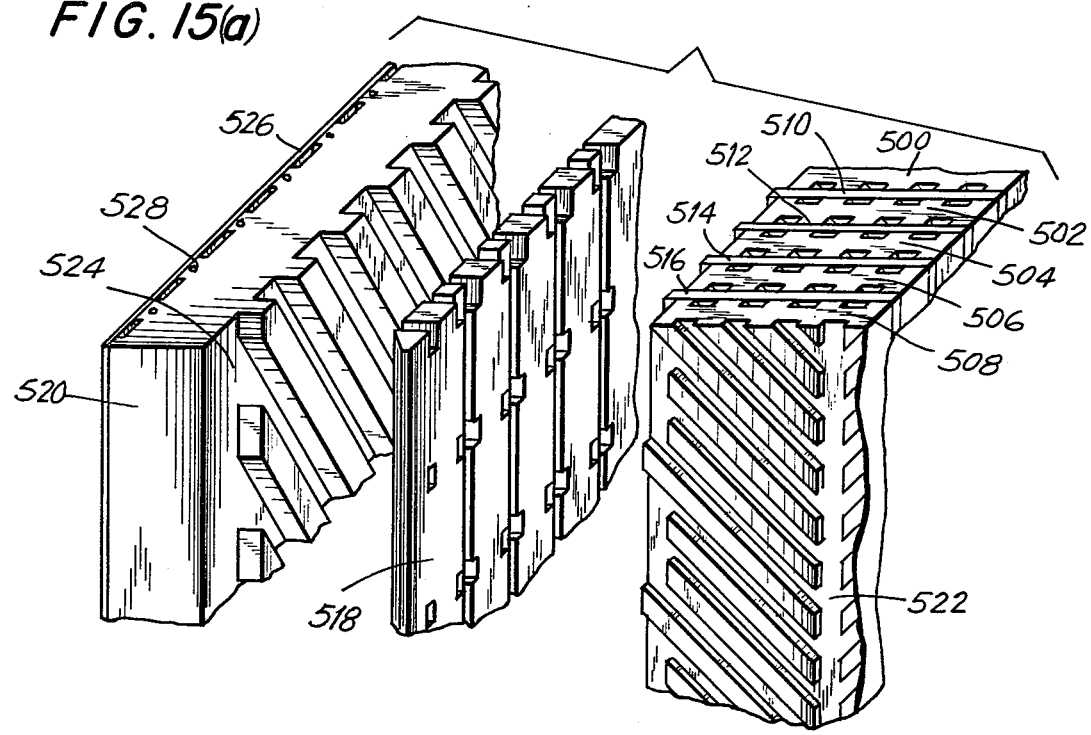
FIGS. 15(a) and (b) are respectively exploded and sectional views of a jacketed pool cooling coil segment.

FIGS. 15(a) and (b) are respectively exploded and sectional views of a jacketed coil segment. Therein are illustrated, by way of example, conductors 500, 502, 504, 506, 508 etc. separated by insulator slabs 510, 512, 514 and 516, etc. An insulator slab 518 running perpendicular to the aforesaid slabs is employed along with jacket or case 520. The conductor elements are provided with a plurality of cooling medium passages 522 in the manner which has been described hereinabove. Superconductors are contained within the conductive slabs as also has been described hereinabove. The inner face of the casing is similarly provided with cooling medium channels indicated at 524. Also, provided are auxiliary cooling and warmup channels indicated at 526 and electrical warmup circuits indicated at 528. Vertical helium cooling channels are provided at the internal corners of the case as indicated at 530.

Figure 15B:
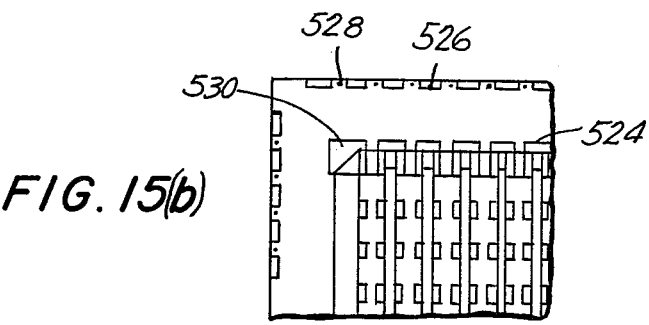
Figure 16:
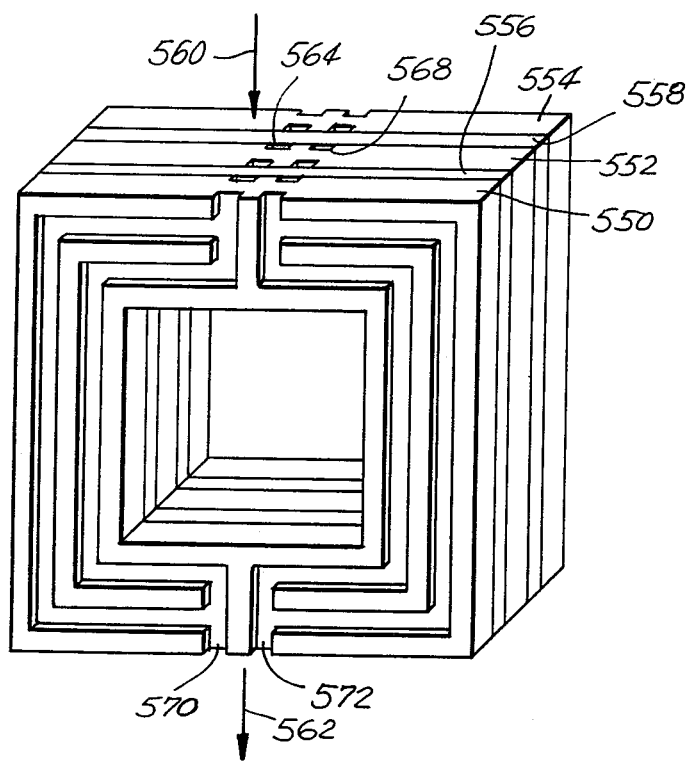
FIG. 16 diagrammatically illustrates conceptual force flow cooling design for the segment.

The conceptional force cooling channel design appears in FIG. 16 wherein are diagrammatically illustrated a plurality of conductors 550, 552 and 554 separated by insulators 556 and 558. The number of conductors and insulators in this illustration is purely arbitrary, as is also the case in FIGS. 15(a) and 15(b). Herein is illustrated in the form of arrow 560 a pressurized helium input with the helium output being indicated at 562. The passages into the cooling channels within the conductors are indicated, for example, at 564 and 568 and output channels for passages are indicated at 570 and 572.

For a magnet system comparable to UWMAK-II fusion reactor proportions which, for example, might require 30 m.×20 m. coils, a field $B_o$ of 3.7 Tesla at 13 meters and $10^7$ amp turns per coil are required. For a rectangular coil of 30 meters by 20 meters and with the $\bar{I} \times \bar{B}$ force varying linearly through the coil thickness from a maximum on the inside to zero on the outside, the following forces act on each leg of the rectangular coil:

$8.1 \times 10^7$ lbs. or $3.6 \times 10^8$ N on each 20 m horizontal leg
$2.8 \times 10^8$ lbs. or $1.2 \times 10^9$ N on the 30 m inside vertical leg
$6.0 \times 10^7$ lbs. or $2.7 \times 10^8$ N on the 30 m outside vertical leg These in-plane forces are always perpendicular to the leg and acting away from the plasma center.

Since the corner joints are not designed to transmit loads, the force each coil exerts on the central column is just the $2.8 \times 10^8$ lbs. or $1.2 \times 10^9$ N of the inside leg. With 24 coils the total force on the central column is therefore $6.7 \times 10^9$ lbs. or $2.9 \times 10^{10}$ N.

The rectangular geometry of the coil will lead to extremely high stresses if supported only against the center column or at the four corners. Simple beam calculations, considering each leg as a beam with end supports only, show that with a 0.75 m×1.0 m conductor cross-section, a 1.0 m thick steel coil case is needed to keep stresses below 60,000 psi or $4.1 \times 10^8$ N/m². This is obviously an unworkable size case. For a more reasonable coil case thickness of 5 in. or 12.7 cm, with only the ends of the legs in the rectangular coil supported, bending stresses will exceed $6 \times 10^5$ psi ($4.1 \times 10^9$ N/m²) on the horizontal legs. However, beam calculations also show that with two intermediate supports along the horizontal span, these stresses will only reach a maximum of $1.25 \times 10^5$ psi ($8.6 \times 10^8$ N/m²). While this stress is too high a reasonable number of supports (e.g. eight to fifteen) along the span will bring stresses down to acceptable levels and with a sufficient number of supports, stresses will be well below those of unsupported constant tension designs.

To develop a better understanding of the stress levels in the rectangular coil, under various support conditions, a plane linear elastic finite element code was used to investigate the problem. Because of the plane nature of the code, a unit thickness layer of the coil was modeled. In doing so, the stiffening effect of the coil case sides was neglected and only the support against bending given by the coil case top and bottom were taken into account making the model a conservative approximation.

Two sets of computer runs were made: Several calculations of the stresses in the entire coil under various support conditions were done. When a reasonable support scheme was established, a more detailed model of each of the legs was analyzed with the finite element code.

With $Nb_3Sn$ ($Nb_3Al$ and $Nb_3Ge$ are alternatives) as the superconductor, stresses in the copper stabilizer should be kept below 15,000 psi to avoid strains greater than 0.002 (B. Badger et al, "A Wisconsin Toroidal Fusion Reactor Design", UWFDM-68, University of Wisconsin, November, 1973). Although these limits are not necessary for the NbTi superconductor, it would be desirable to prevent stresses from going above the copper yield point of 12,000 psi. The aim of the following analysis was to keep stresses in the conductor-stabilizer well below the 12,000 psi level. A five-inch thick steel case was considered a reasonable structural reinforcement for the coil.

The whole rectangular coil was modeled using 1888 elements and 1185 nodes for one unit thickness. Elements modeling the copper and steel regions were given appropriate material properties. Supports were simulated by fixing the nodes on the outside of the steel coil case where a support would be placed.

As expected, if a rectangular coil was only supported on the central column analogous to D-shaped magnets, stresses on the order of $7 \times 10^5$ psi ($4.8 \times 10^9$ N/m²) in the steel arose in the corners. Even if the four corners were clamped and the inner leg supported along the central column, stresses were still on the order of $6 \times 10^5$ psi ($4.1 \times 10^9$ N/m²), similar to the values found by the simple beam calculations.

A reasonable support scheme was found to be the following: Four corners of the coil kept in place by supports plus eleven supports equally spaced along the 30 meter vertical legs. In addition, ten supports were used along each horizontal leg. These were not evenly spaced since the magnetic force varied along these legs and closer support spacing was used where the force was stronger.

With this support configuration, stresses in the steel coil case stayed below 14,000 psi ($9.6 \times 10^7$ N/m²) while conductor stresses remained below 7,500 psi ($5.2 \times 10^7$ N/m²) everywhere except on the inner vertical leg at the support points themselves. Compressive stresses at these inner eleven supports became too high, i.e., 30,000 psi in the conductor. However, with a more continuous type of support along the central cylinder to distribute the centering force more evenly, these stresses were brought below 7,500 psi also.

Since the above support system provided a very favorable stress calculation using the whole coil model, a more detailed analysis of each coil leg was performed using finite element grid. With supports in the same location as for the whole coil case, stresses in the outside vertical leg were about 15 percent higher in the steel, but about 20 percent lower in the copper. Such stress changes were consistent with the change in element size. Stresses in the high field regions of the horizontal legs were almost 40 percent higher in detailed computer runs.

The finite element calculations also showed that the bottom, i.e., inside of the coil case, was very lightly stressed. The most economic and efficient case, therefore, seems to be one with three relatively thin sides, about two inches thick and a heavier side, about five or six inches thick on the outside of the coil.

Since the entire coil and case will be operating, for example, at 4K, thermal stresses could occur due to the different thermal contractions of the materials in the coil. In cooling from room temperature to 4° K., copper contracts about 0.0034 in./in. and 304 stainless steel about 0.0030 in./in while the ceramic insulators contract on the order of $10^{-6}$ in./in. and are, therefore, rigid compared to the copper and steel. In assembling the coil then, the ceramic insulators must be kept somewhat shorter than the copper conductor plates, leaving slight gaps which will be closed due to the copper shrinkage. Differences in shrinkage between copper and steel through the coil cross-section can be alleviated by appropriate choice of thickness of t9 However, different contractions along the length of a leg can give rise to thermal stresses. The rigidity of the ceramic is not a problem since the insulator can be put between the conductors in long parallelogram-shaped sections whose ends could slide over each to compensate for the contraction in the steel and copper. Over the 30 meter length of a coil leg, however, the copper will try to contract 0.5 inches more than the stainless steel. This means that tensile stresses in the copper (on the order of 7,000 psi) may cause the soldered joints at the coil corners to separate and disrupt good electrical contact. Several solutions exist to overcome this problem: The conductors could be anchored to the coil in several locations along the span so that the ends of the legs see only a small part of the total contractions. Also, movement in the joints may be prevented by a non-metallic bolt arrangement to give mechanical strength to the soldered joints. Designing bellow sections into the steel case is another solution. A very desirable solution would be the use of a steel whose contraction more closely matches that of the conductor.

As indicated previously, large rectangular coils are only structurally feasible if supports along the span of the legs are provided to transmit the load from the coil to the support structure. A hydraulically controlled and adjustable system would provide reliable yet sensitive supports capable of transmitting high loadings. Hydraulics provide a means of moving the support pads with a uniform and controlled velocity while adjusting their bearing pressures with accuracy. The supports could be adjusted to compensate for the thermal shrinkage during cool-down and the centering effect when the currents start flowing through the coils.

Figure 17:
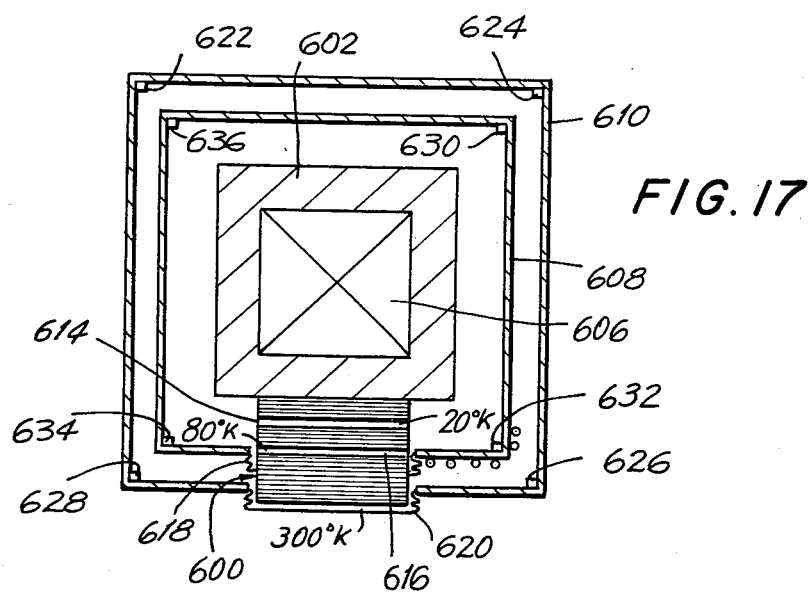
FIG. 17 diagrammatically illustrates in cross-section a coil segment surrounded by dewars and supported.
Figure 18:
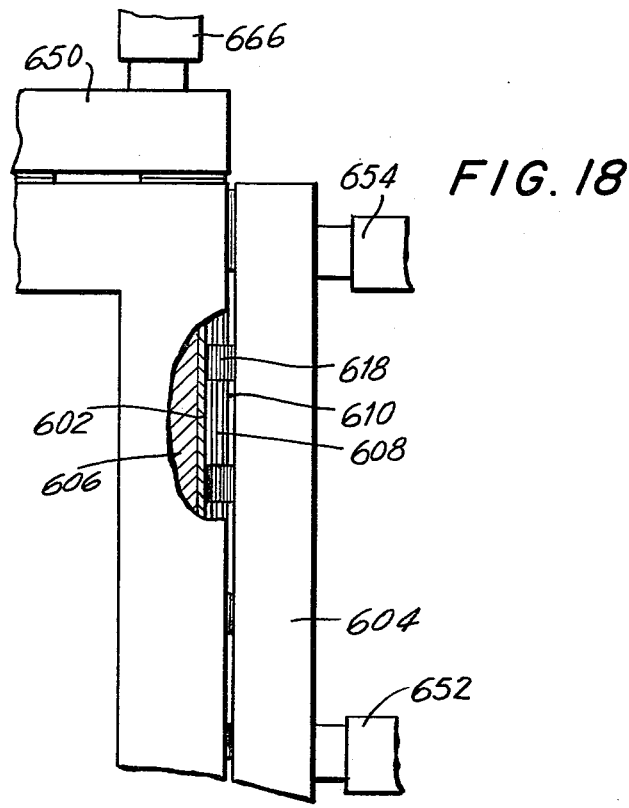
FIG. 18 diagrammatically illustrates in side and fragmentary view the coil segment and support structure of FIG. 17.

Individual hydraulic rams can be extended from the support structure to the laminated support pads carrying the coil case load through the dewar shown in FIG. 17. While these individual rams would allow very accurate control, so many individual hydraulic drives would increase the chance of failure of a support. A more reliable system is one where the laminated support pads such as at 600 from the coil case 602 are engaged by a massive beam 604 running along the coil leg length with only a few hydraulic drives along its span (FIG. 18). Such a system, while simpler and more reliable, would also take up more room and may restrict access to the coils to a greater degree. If the support structure surrounds a coil leg, hydraulic supports may also be considered for providing lateral stability against out-of-plane forces.

For purposes of analysis, the supports used in the stress analysis were fixed at 1 meter by 0.5 meter by 0.25 meter deep. Stress values were calculated with the support points as absolutely rigid. Other calculations were made simultating the supports with finite elements with a stiffness of $10^7$ psi or $6.9 \times 10^{10}$ N/m$^2$. Actual support pads consist of alternate layers of epoxy-fiberglass and steel to reduce heat leak. With a $10^7$ psi support stiffness, maximum stresses in the outside vertical leg with eleven equally spaced supports as before were 12,000 psi ($8.34 \times 10^7$ N/m$^2$) in the steel and 6,000 psi ($4.14 \times 10^7$ N/m$^2$) in the copper. The maximum stress in the support pad came to 14,300 psi ($9.86 \times 10^7$ N/m$^2$) and in the copper they were 10,500 psi ($7.2 \times 10^7$ N/m$^2$). In the high field region of the horizontal leg, stresses in the support pad were now 31,000 psi or $2.1 \times 10^8$ N/m$^2$.

With more particular reference to the structure in FIG. 17, it is seen that the coil case 602 encompasses the coil 606. In addition, there is provided an 80° K. radiation shield indicated at 608 and an outer dewar indicated at 610. Liquid nitrogen piping is diagrammatically indicated at 612. In the laminated support 600, there are provided 20° K. and 80° K. heat stations 614 and 616. Bellows are indicated at 618 and 620. Frame posts for the outer dewar 610 are shown at 622, 624, 626 and 628. Frame posts for the 80° K. radiation shield are indicated at 630, 632, 634 and 636.

With reference to FIG. 18 and the support beam 604 referred to therein, another support beam is indicated at 650. Two of the support beams are connected hydraulic drives 652, 654 and 666 shown by way of example. These constitute physical displacement means for moving the support beam and accordingly, the coil segments attached thereto.

Also, visible in FIG. 18 are the laminated supports 618 steel case 602, conductor or coil 606 and dewar 610. The hydraulic drives are exemplary only of the various types and numbers of drives which may be employed to displace coil segments in a manner which has been generally indicated for illustrative purposes hereinabove. These hydraulic drives are of particular value in accommodating dimensional variations due to thermal change and stresses due to magnetic fields when the interdigitated fingers of the segments are soldered together. Thus, the pistons of these drives may be positionally adjusted as necessary. On the other hand, if slidingly engaged interdigitated fingers are used, the supports may be rigidly fixed in position except for segment removal.

Figure 20:
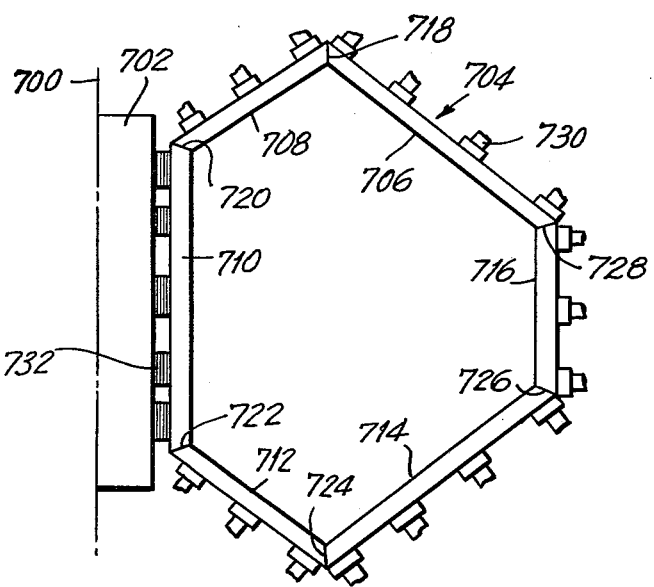
FIG. 20 illustrates diagrammatically and in side view a coil variation constituting a further embodiment of the invention.

FIG. 20 illustrates a further embodiment of the invention wherein the central axis is indicated at 700 with reference to a central or bucking column 702 supporting a hexagonal coil indicated generally at 704.

The coil 704 includes a plurality of segments indicated at 706, 708, 710, 712, 714, and 716. These are the six coil segments constituting the hexagon referred to hereinabove. Between these coil segments are joints 718, 720, 722, 724, 726 and 728 whereat the coil segments are joined and possibly disjointed.

Also, indicated in FIG. 20 are a plurality of hydraulic drives and supports, of which the hydraulic drives and support 730 is indicated by way of example. It is the function of the hydraulic drives to move the segments into and out of position according to the connection thereof with contiguous segments in the manner which has been discussed in greater detail hereinabove.

Further illustrated in FIG. 20 are the laminated supports of which support 732 is indicated by way of example. These supports connect the coil 704 to the bucking column 702 whereby the coil as a whole may be fixed to the associated toroidal structure (i.e., the blanket and shield structures).

Figure 19:
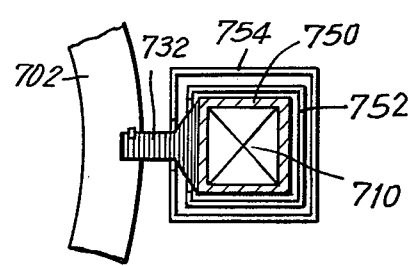
FIG. 19 shows a variation of FIG. 17.

Reference to FIG. 19 shows the bucking column or cylinder 702 and laminated support 732 connected, for example, to coil segment 710. In association with coil 710 is a jacket 750, radiation shield 752 and dewar 754.

Another type of fusion reactor is a Tokamak Tower reactor. Two features of Tokamak power reactors that may restrict their use in utility grid systems are poor accessibility for blanket repair or replacement, and the relatively long time between plasma burns. The first factor may result in low plant availability because of long down times for blanket maintenance and replacement operations, while the second requires some form of expensive energy storage or backup energy generation to fill in the dwell times between plasma burns.

Blanket accessibility can be greatly improved with the MAXAMAK (Maximum Access Tokamak) approach. The blanket and shield assembly is split on the reactor midplane, when the blanket is to be repaired or replaced. The lower half together with its associated coils and other subsystems can be lowered several meters to given open access to all portions of the blanket, including those on the inboard side of the plasma. Relatively large blanket modules can then be removed directly out through the large opening created by separation of the upper and lower halves. In addition, the modules can be designed to be poloidally continuous around each half of the blanket/shield assembly but segmented in the toroidal direction with all coolant lines passing through the shield at the outside midplane of the plasma chamber. Coolant line/header connections then can be made or unmade outside the shield with direct access capability. A MAXAMAK reactor based on a plasma size (a=1.2 m, b=1.92 m, $R_o$=5.6 m) similar to the MIT collisional Tokamak (Cohn, D. R. et al, "A High Density, High Field Tokamak Demonstration Power Reactor", Proc. 2nd ANS Topical Meeting, Richland, Wash. ((Sept. 1976))) design is next discussed. For a Al/Be/graphite/LiAlO$_2$ blanket of seventy-two modules. Individual module weight is seven metric tons, which is readily handled by a remotely operated crane extended into the access opening created by lowering the bottom half of the blanket/shield assembly. The thirty-six upper blanket modules remain attached to the thirty-six lower blanket modules as the bottom half of the reactor is lowered three meters and then are removed by crane. After their removal, the lower modules are then removed. The vertical height of the TF coil assembly must be sufficient to accommodate the movement of the bottom half. This is practical using the magnet of the invention. By carrying magnetic forces to external reinforcement, a wide range of coil shapes is possible, and a large vertical TF coil height can be achieved while retaining a relatively small radial extent of the TF coil.

Figure 21:
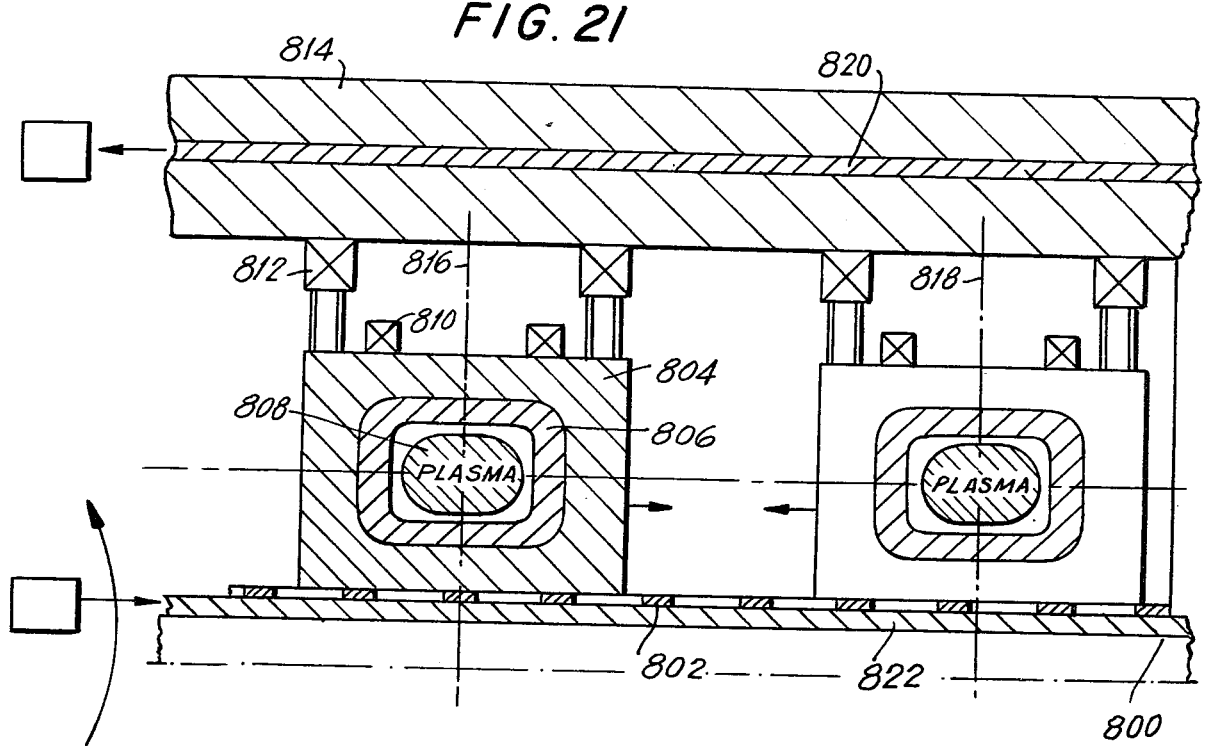
FIG. 21 diagrammatically illustrates a MULTIMAK reactor in cross-section.

The second approach is the MULTIMAK (Multiple Plasmas Chamber Tokamak) shown in FIG. 21. Several small high field Tokamak plasmas can be efficiently grouped in one TF coil assembly. As with the MAXAMAK, the magnet construction allows the TF coil assembly to be elongated in the vertical direction without an accompanying increase in the radial direction. The return TF conductors are in slots in the room temperature PCRV and transfer their magnetic forces to it through a set of low thermal conductivity support pads. Hydraulic pistons accommodate thermal expansion/contraction effects and adjust loading so as to keep low stress in the conductors. The reactor in FIG. 21 has 3 plasma chambers, with operation time phased so that 2 are always operating. As a given chamber ends its burn, the chamber that has finished its pump-down cycle begins its burn. This allows a much larger fraction of the reactor cycle to be used for pump-down, compared to a reactor with one plasma chamber. Vacuum, beam, and common power systems may be shared, which will reduce their unit costs. The overall size of the reactor PCRV with its 3 internal plasma chambers (comparable to the MIT collisional Tokamak, see Cohn, D. R., supra) the PCRV for an HTGR. With 2 chambers operating, the power output is $\sim$2000 MW (e) compared to $\sim$1500 MW (e) for an HTGR. Plasma chambers can be split along the midplane for ready accessibility to the blanket as in the MAXAMAK.

Referring more particularly to FIG. 21, there is indicated a central support column 800 atop which are provided supports 802. Also included are a shield 804 and a blanket 806, the plasma chamber being indicated at 808. Fast noding OH coils are indicated at 810 and SC VF cols are indicated at 812. The PCRV is indicated at 814 and the reactor midplane is indicated at 816 and at 818. The outer TF conductor is indicated at 820 and the inner TF conductor is indicated at 822.

Figure 22:
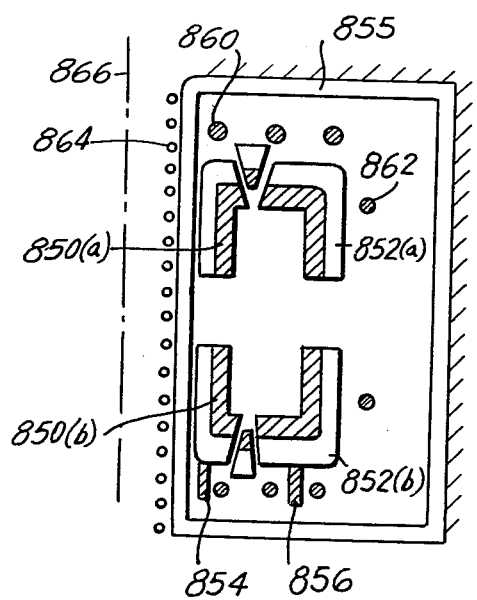
FIG. 22 illustrates a MAXIMAK reactor in which the blanket is segmented.

In FIG. 22 are indicated blanket parts 850(a) and 850(b). The shield is shown at 852(a) and 852(b). Supports 854 and 856 are provided which raise or lower the bottom half of the reactor. The TF coil of the invention is indicated at 858. Diverter VF and OH coils are indicated at 860 and 862. OH coils are also indicated at 864. The central axis of the structure is indicated at 866.

Reference has been made previously to a magnet structure suitable for use with a UWMAK-II reactor. To give some example dimensions of coils and coil arrangements suitable for use with such a reactor as well as structural parameters, reference is made to Tables I and II as follows:

TABLE I

| MAGNET PARAMETERS (UWMAK-II SIZE) | |
|---|---|
| No. of coils | 24 |

TABLE I-continued
MAGNET PARAMETERS
(UWMAK-II SIZE)

| | |
|---|---|
| Coil size | 20m × 30 m |
| Coil Cross-Section (including 4-side insulation) each 2 cm thick) | 0.785m × 1.04 m |
| No. of Turns Per Coil | 50 |
| Conductor Sizes (SC and Copper) | (1) 0.01m × 1m × 30m |
| | (2) 0.01m × 1m × 20m |
| SC Sizes*(NbTi) | (1) 0.001m × 1m × 30m |
| | (2) 0.001m × 1m × 20m |
| Insulator Sizes** | (1) 0.005m × 1m × 30m |
| | (2) 0.005m × 1m × 20m |
| Peak Field at Conductor (@5.75m) | 8.35 Tesla |
| Field at Plasma Center (@13.0m) | 3.69 Tesla |
| Operating Current | $2 \times 10^5$ amps |
| Amp-Turns Per Coil | $10^7$ |
| Total Amp-Turns | $2.4 \times 10^8$ |
| Average Current Density Over Conductor | 2000A/cm$^2$ |
| Average Current Density Over Coil | 1300A/cm$^2$ |
| Required Heat Transfer Rate When All Current Flows in Copper Stabilizer | 0.2 watt/cm$^2$ |
| Inductance Per Coil | 0.33 henry |
| Total Inductance | 7.9 henry |
| Stored Energy Per Coil | $6.6 \times 10^9$ joules |
| Total Stored Energy | $1.58 \times 10^{11}$ joules |
| Average Pulsed Field Rate Over TF Coil | 0.5 Tesla/sec. |
| Rise Time (or down-time) | 1 second |
| Plasma Burn Time | 1000 seconds |
| Estimated Heat Leaks (Eddy current, power lead, coil case supports, etc.)-Rm. temp. power requirement | 16.62 Mw |
| Estimated Refrigeration Requirement-Rm. temp. power requirement | 20 Mw |
| Total Conductor Length Per Coil | 4800 m |
| Total Conductor Volume Per Coil | 48 m$^3$ |

*SC cross-section calculated for highest field of 8.35 Tesla
**Approximate dimensions

TABLE II
STRUCTURAL PARAMETERS
(UWMAK-II SIZE)

| | | | | |
|---|---|---|---|---|
| Coil Case Thickness | 5 | in. | 12.7 | cm. |
| Central Column Thickness | 19.7 | in. | 50 | cm. |
| Stresses in Coils and Supports | | | | |
| Horizontal Legs | | | | |
| No. of Intermediate Supports | 10 | | | |
| Max. Stress in Steel Case | 14 | ksi | $9.6 \times 10^7$N/m$^2$ | |
| Max. Stress in Conductor | 10 | ksi | $6.9 \times 10^7$N/m$^2$ | |
| Max. Stress in Supports | 31 | ksi | $2.1 \times 10^8$N/m$^2$ | |
| Outside Vertical Leg | | | | |
| No. of Intermediate Supports | 11 | | | |
| Max. Stress in Steel Case | 12 | ksi | $8.3 \times 10^7$N/m$^2$ | |
| Max. Stress in Conductor | 6 | ksi | $4.1 \times 10^7$N/m$^2$ | |
| Max. Stress in Supports | 14 | ksi | $9.6 \times 10^7$N/m$^2$ | |
| Inside Vertical Leg | | | | |
| Continuous Support Along Entire Length | | | | |
| Max. Stress in Steel Case | 6 | ksi | $4.1 \times 10^7$N/m$^2$ | |
| Max. Stress in Conductor | 4 | ksi | $2.8 \times 10^7$N/m$^2$ | |
| Max. Stress in Support | 6 | ksi | $4.1 \times 10^7$N/m$^2$ | |
| 50% of Length Supported | | | | |
| Max. Stress in Steel Case | 9 | ksi | $6.2 \times 10^7$N/m$^2$ | |
| Max. Stress in Conductor | 5 | ksi | $3.4 \times 10^7$N/m$^2$ | |
| Max. Stress in Supports | 11 | ksi | $7.6 \times 10^7$N/m$^2$ | |

It will, of course, be obvious that the above parameters are exemplary only and that many modifications are of course possible according to reactor requirements.

There will now be obvious to those skilled in the art many modifications and variations of the structures and methods set forth hereinabove. These variations and modifications will not depart from the scope of the invention if defined by the following claims.

What is claimed is:

1. Apparatus comprising at least one superconducting coil and means operatively associated with said coil to constitute therewith at least part of a superconductor magnet system, said coil further comprising:
    (a) at least two coil segments, said segments each further comprising a plurality of parallel conducting elements including end portions in a spaced relation one to the other, said spaced end portions of adjacent segments being interdigitated to provide electrical connections between said conducting elements of said adjacent segments so that said conducting elements form a helix;
    (b) means for demountably connecting said interdigitated end portions of said adjacent segments to form conducting joints enabling facile assembly and disassembly of said coil segments, whereby installation, replacement, repair and maintenance are facilitated;

(c) external means for supporting said coil segments and said joints to prevent stresses in said coil from exceeding the level at which said coil would revert to a state of normal conductivity, said support means and said connecting means being constructed to enable relative motion between said support means and said interdigitated end portions to prevent stresses caused by thermally caused dimensional changes, said support means being attached to the joined coil segments at a predetermined plurality of locations around the perimeter of said coil.

2. Apparatus as claimed in claim 1 wherein said support means is a displaceable support which accommodates said dimension changes and stresses.

3. Apparatus as claimed in claim 1 wherein said support means is a rigid support which supports said segments for displacement relative to each other.

4. Apparatus as claimed in claim 1 wherein said coil includes a plurality of sides, at least one of said sides being of generally rectilinear form, at least one of said segments also being of generally rectilinear form.

5. Apparatus as claimed in claim 4 wherein said support means comprises load bearing means coupled to at least one of said segments and operative to support the same and support at least part of the weight thereof.

6. Apparatus as claimed in claim 5 comprising a heat insulating means connecting the load bearing means to said coil.

7. Apparatus as claimed in claim 6 wherein said heat insulating means includes a laminated support supporting at least part of the weight of the coil on said load bearing means.

8. Apparatus as claimed in claim 5 wherein said support means includes means for the relative displacement of at least one of the segments into and out of engagement with the other of the segments.

9. Apparatus as claimed in claim 7 wherein said support means includes means for the relative displacement of at least one of the segments into and out of engagement with the other of the segments.

10. Apparatus as claimed in claim 1 comprising insulating means between adjacent of the conducting elements in each segment.

11. Apparatus as claimed in claim 10 wherein each of the conducting elements includes two elongated slabs in facing relation and cooperatively having proximal and distal faces, and a superconductor extending between said slabs.

12. Apparatus as claimed in claim 11 wherein the slabs are provided, in the distal faces thereof, with an arrangement of cooling grooves for the passage of a cooling medium.

13. Apparatus as claimed in claim 11 wherein each segment includes a casing encircling the plurality of conducting elements thereof.

14. Apparatus as claimed in claim 8 wherein adjacent of the segments have contiguous ends and each segment includes a plurality of parallel conducting elements including end portions in spaced relation, the respective end portions of adjacent of the segments being in interdigitated relation, and solder connecting the interdigitated end portions so that the conducting elements are connected in the form of a helix.

15. Apparatus as claimed in claim 14 comprising insulating means between adjacent of the conducting elements in each segment.

16. Apparatus as claimed in claim 15 wherein each of the conducting elements includes two elongated slabs in facing relation and cooperatively having proximal and distal faces, and a superconductor extending between said slabs.

17. Apparatus as claimed in claim 16 wherein the slabs are provided, in the distal faces thereof, with an arrangement of cooling grooves for the passage of a cooling medium.

18. Apparatus as claimed in claim 17 wherein each segment includes a casing encircling the plurality of conducting elements thereof.

19. Apparatus as claimed in claim 18 wherein the conducting elements have longitudinal edges and gaps are provided between the casing and said edges to accommodate changes of dimension of the conducting elements due to temperature changes.

20. A nuclear fusion reactor comprising means for containing plasma, including blanket and shield means in toroidal form, a plurality of superconducting coils radially disposed relative to and engaged with said blanket and shield means, each of said coils further comprising:

(a) at least two coil segments, said segments each further comprising a plurality of parallel conducting elements including end portions in a spaced relation one to the other, said spaced end portions of adjacent segments being interdigitated to provide electrical connections between said conducting elements of said adjacent segments so that said conducting elements form a helix;

(b) means for demountably connecting said interdigitated end portions of said adjacent segments to form conducting joints enabling facile assembly and disassembly of said coil segments, whereby installation, replacement, repair and maintenance are facilitated;

(c) external means for supporting said coil segments and said joints to prevent stresses in said coil from exceeding the level at which said coil would revert to a state of normal conductivity, said support means and said connecting means being constructed to enable relative motion between said support means and said interdigitated end portions, said support means being attached to the joined coil segments at a predetermined plurality of locations around the perimeter of said coil.

21. A reactor as claimed in claim 20 wherein the blanket and shield means are of separable sections and each of said coils is in the form of a polygon including a plurality of sides at least one of which is formed at least in part by one of said segments.

22. A reactor as claimed in claim 21 wherein said support means comprises, for each said coil, means to displace said one segment thereof relative to the other segments thereof to facilitate detaching the corresponding coil from said blanket and shield means.

23. A reactor as claimed in claim 20 wherein one of said segments is U-shaped and another of said segments is rectilinear and is positioned to close said one segment.

24. A reactor as claimed in claim 20 wherein at least two of said segments are of rectilinear form.

25. A reactor as claimed in claim 20 wherein one of said segments is L-shaped.

26. A superconducting coil adapted for use in a fusion reactor comprising:
(a) a plurality of coil segments, said segments each further comprising:
 (a1) a plurality of parallel conducting elements, said elements further comprising a superconductor and a stabilizer for said superconductor; and,
 (a2) a plurality of insulators between said elements, the end portions of said conducting elements extending beyond said insulators and being in a spaced relation, one to the other, whereby said spaced end portions interdigitated with, and provide electrical connection between, said conducting elements of adjacent segments, so that said conducting elements form a helix;
(b) means for demountably connecting said interdigitated end portions of said adjacent segments to form conducting joints enabling facile assembly and disassembly of said coil segments, whereby installation, replacement, repair, and maintenance are facilitated, said connected segments forming a polygon; and,
(c) external means for supporting said coil segments and said joints to prevent stresses in said coil from exceeding the level at which said coil would revert to a state of normal conductivity, said support means and said connecting means being constructed to enable relative motion between said support means and said interdigitated end portions to prevent stresses caused by thermally caused dimensional changes, said support means being attached to said joined coil segments at a predetermined plurality of locations aroung the perimenter of said coil.

27. A coil as claimed in claim 26 wherein each conducting element and each insulator is a rectilinear slab.

28. A coil as claimed in claim 26 wherein each of said conducting elements includes two parts in face-to-face relation and having proximal and distal faces, and a superconductor between said parts.

29. A coil as claimed in claim 28 wherein said parts are of copper.

30. A coil as claimed in claim 28 wherein the distal faces are provided with grooves for the passage of a cooling medium.

31. A coil as claimed in claim 28 wherein each of said segments includes a casing encompassing the conducting elements and insulators thereof and defining therewith coolant channels extending longitudinally and transversely along the corresponding segment.

32. A coil as claimed in claim 28 wherein each of said conducting elements is oriented so as to minimize eddy current losses due to the polodial magnetic field when said coil is incorporated in a nuclear fusion reactor.

33. A method of improving the fabrication, installation, maintenance and repair of a fusion reactor which includes a toroid structure engaged by a plurality of radially disposed superconducting coils comprising fabricating said coils from a plurality of coil segments, each segment comprising a plurality of parallel conducting elements, the end portions of said conducting elements being in a spaced relation one to the other, whereby said spaced end portions may be interdigitated with, and electrical connection made between, said conducting elements of adjacent segments to form said coil and supporting said coil at a predetermined plurality of locations about its perimeter to prevent stresses in said coil from exceeding the level at which said coil would revert to normal conductivity, and to allow relative motion between said interdigitated end portions and said supports to prevent stresses caused by thermally caused dimensional changes.

34. A method as claimed in claim 33 wherein the coils are formed with a polygonal shape.

35. A method as claimed in claim 33 comprising physically connecting the segments and mounting at least some of the segments on displaceable suppots.

36. A method as claimed in claim 33 comprising fabricating the segments at a station remote from the toroid structure and connecting the segments together on site at the toroid structure.

37. A method as claimed in claim 35 wherein each of the segments are fabricated by arranging a plurality of conductive slabs in spaced parallel relation with insulative slabs therebetween, the conductive slabs being made with a length greater than that of the insulative slabs to form fingers for connection to another segment.

38. A method as claimed in claim 36 comprising interdigitating the fingers of adjacent segments and soldering the interdigitated fingers together.

39. A method as claimed in claim 37 comprising forming the conductive slabs of two parts which are arranged in face-to-face relation with proximal and distal faces, and arranging a superconductor between said parts.

40. A method as claimed in claim 38 comprising forming grooves in the distal faces for the passage of a cooling medium.

41. A method as claimed in claim 34 comprising disconnecting at least one of said segments and removing the thusly disconnected segment by manipulation of the associated displaceable support.

42. A method as claimed in claim 34 wherein the said supports are displaced to accommodate distortion due to thermal changes and magnetic fields.

43. A method as claimed in claim 39 comprising providing a superconductor positioned between and in thermal contact with said proximal faces and extending for substantially the length of said slabs.

* * * * *